US007876255B2

(12) United States Patent
Conway, Jr. et al.

(10) Patent No.: US 7,876,255 B2
(45) Date of Patent: Jan. 25, 2011

(54) CONTROLLING DEVICE USING VISUAL CUES TO INDICATE APPLIANCE AND FUNCTION KEY RELATIONSHIPS

(75) Inventors: James N. Conway, Jr., Laguna Beach, CA (US); Adam N. Villani, Long Beach, CA (US)

(73) Assignee: Universal Electronics Inc., Cypress, CA (US)

( * ) Notice: Subject to any disclaimer, the term of this patent is extended or adjusted under 35 U.S.C. 154(b) by 1969 days.

(21) Appl. No.: 10/664,629

(22) Filed: Sep. 19, 2003

(65) Prior Publication Data

US 2005/0062636 A1 Mar. 24, 2005

(51) Int. Cl.
*H04L 17/02* (2006.01)

(52) U.S. Cl. .......................... 341/176; 341/23; 341/34; 340/825.69; 340/825.72

(58) Field of Classification Search ................ 341/173, 341/176, 23, 34; 340/825.69, 825.72
See application file for complete search history.

(56) References Cited

U.S. PATENT DOCUMENTS 4,623,887 A 11/1986 Welles, II
4,959,810 A 9/1990 Darbee et al.
5,255,313 A 10/1993 Darbee
5,311,175 A 5/1994 Waldman
5,412,189 A 5/1995 Cragun
5,552,917 A 9/1996 Darbee et al.
5,614,906 A 3/1997 Hayes et al.
5,778,256 A 7/1998 Darbee
5,818,361 A 10/1998 Acevedo
5,959,751 A 9/1999 Darbee et al.
5,977,867 A 11/1999 Blouin
6,014,092 A 1/2000 Darbee et al.
6,104,334 A 8/2000 Allport
6,225,938 B1 5/2001 Hayes et al.
6,281,812 B1 8/2001 Kim
6,340,800 B1 * 1/2002 Zhai et al. ................... 200/5 R
6,549,133 B2 * 4/2003 Duncan et al. ........... 340/573.3
6,608,271 B2 * 8/2003 Duarte ....................... 200/311
6,680,677 B1 1/2004 Tiphane
6,791,449 B2 * 9/2004 Dewan ...................... 340/5.25
6,798,359 B1 * 9/2004 Ivancic ........................ 341/23
6,803,874 B1 * 10/2004 Weber ........................ 341/176
7,064,663 B2 * 6/2006 Pucci et al. ............ 340/539.32
2003/0025840 A1 2/2003 Arling

OTHER PUBLICATIONS

PALMGEAR.COM, NoviiMedia, NoviiRemote 2.1, pp. 1-5, May 12, 2003, www.palmgear.com/index.cfm?fuseaction=software.showsoftware&sid=EF7D09A3.

* cited by examiner

*Primary Examiner*—Albert K Wong
(74) *Attorney, Agent, or Firm*—Greenberg Traurig, LLP

(57) ABSTRACT

A controlling device, such as a universal remote control, that uses visual and/or audio cues, such as sounds, color, patterns, shapes, etc., to indicate a relationship between a function key and an intended target appliance for a command transmitted in response to activation of the function key.

15 Claims, 7 Drawing Sheets

CONTROLLING DEVICE USING VISUAL CUES TO INDICATE APPLIANCE AND FUNCTION KEY RELATIONSHIPS

BACKGROUND

The following relates generally to controlling devices and, more particularly, to a controlling device that uses visual cues, such as color, to indicate appliance and function key relationships.

Manufacturers typically provide a remote control with an appliance and, as such, different appliance types of different manufacturers are often commanded with different remote controls. To minimize the number of individual remote controls a user requires, universal remote controls have been developed. Accordingly, universal remote controls for commanding various functions of various types of appliances of various manufacturers have become quite widespread. By way of example, universal remote controls are described in commonly assigned U.S. Pat. Nos. 4,959,810, 5,255,313 and 5,552,917.

Universal remote control applications for use in connection with hand-held devices such as personal digital assistants ("PDAs") are also known in the art. In this regard, the universal remote control applications effectively turn the host computing device into a universal remote control capable of being used to command various functions of various types of appliances of various manufacturers. By way of example, commonly assigned U.S. Pat. No. 5,778,256 discloses a PDA having a separate infrared generating device connected to its printer port for controlling home appliances and commonly assigned U.S. Published Patent Application No. 2003/0103088A1 discloses a hand-held electronic device, such as a PDA, having a remote control application user interface that functions to display operational mode information to a user and usable, among other things, to setup the remote control application to control appliances for one or more users in one or more rooms, to perform activities, and to access favorites.

Still further, NoviiRemote provides a universal remote control application for use in connection with a Palm brand PDA. In the graphical user interface of the NoviiRemote, groups of function keys are color coded according to a logical category, e.g., volume function control keys are always displayed using a red color, transport function control keys are always displayed using a yellow color, and channel function control keys are always displayed using a green color. While this allows a user a readily discern the various function keys on the graphical user interface, no information is imparted to the user as to which appliance will be controlled upon actuation of a function key. The need for this imparting of information will become apparent from the discussion that follows.

For selecting which of multiple appliances a universal remote control is to command, a universal remote control may allow a user to place the universal remote control into an operational mode whereby the function keys will be used to transmit commands to a "primary" target appliance that has been associated with that operational mode. For example, a "TV" operational mode may be selected to place the universal remote control into an operational mode whereby function keys are used to transmit commands primarily to a designated television, a "VCR" mode may be selected to place the universal remote control into an operational mode whereby function keys are used to transmit commands primarily to a designated VCR, etc. It is to be appreciated, however, that within an operational mode, certain function keys may nevertheless be "locked" so as to transmit commands to a target appliance that does not correspond to the "primary" target appliance that has been associated with that operational mode. For example, volume function keys may be "locked" to an amplifier such that, when the universal remote control is in a "TV" operational mode activation of a volume function key will cause the universal remote control to transmit a volume control command to the designated amplifier, as opposed to the TV.

A universal remote control may also be provided with a "home theater" operational mode, a "user" operational mode (i.e., one established for a particular user), "room" operational mode (i.e., one established for a particular room), or the like (collectively referred to hereinafter as a "home theater" operational mode) which may be selected to place the universal remote control into an operational mode for commanding multiple, target appliances. For example, a "home theater" mode may be established whereby volume function keys are used to transmit volume control commands to an amplifier, channel function keys are used to transmit channel control commands to a cable box, picture control function keys are used to transmit picture control commands to a television, etc.

While it may be useful to allow a user to command the operation of multiple appliances from an accessible set of function keys (whether through the use of "locked" function keys and/or "home theater" operational modes), users typically become frustrated as they often forget which appliance is assigned as a target for a function key at any given instant. Accordingly, a need exists for a means whereby a user may quickly discern a relationship between a function key and an intended target appliance.

SUMMARY

To address this and other needs, the following discloses controlling devices that use visual cues, such as color, to indicate appliance and function key relationships, the visual cue being provided to allow a user to quickly discern an intended target appliance for commands transmitted in response to activation of a function key. A better appreciation of the objects, advantages, features, properties, and relationships of the disclosed controlling devices will be obtained from the following detailed description and accompanying drawings which set forth illustrative embodiments which are indicative of the various ways in which the principles described hereinafter may be employed.

BRIEF DESCRIPTION OF THE DRAWINGS

For use in better understanding the exemplary controlling devices reference may be had to the following drawings in which.

DETAILED DESCRIPTION

For allowing a user of a controlling device 100 to discern a relationship between a function key and an appliance, the following describes controlling devices 100 that use visual cues, such as color, to indicate the relationship. As will become apparent, the function keys may be implemented as hard keys and/or soft keys so long as the function key is capable of having an appliance indicating visual cue associated therewith. In this regard, the association between the function key and the indicating color may be direct (e.g., by providing a color indicator directly to the function key) or indirect (e.g., by providing a color change to an element, display area, etc. of the controlling device 100 that is linked—either visually or physically—to the function key).

Figure 1:
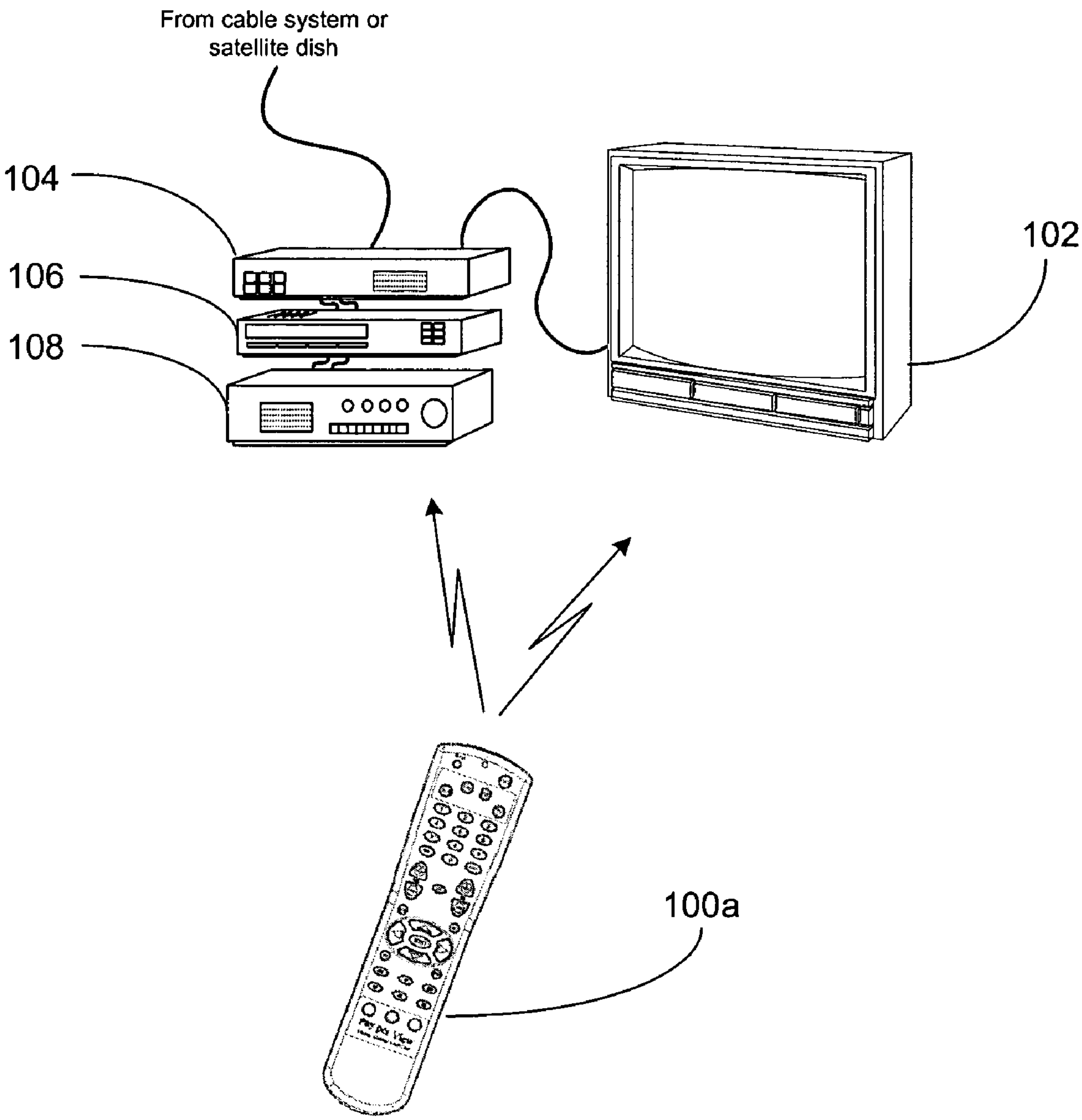
FIG. 1 illustrates an exemplary system in which the exemplary controlling devices may be utilized.

By way of example, FIG. 1 shows an exemplary system, including controllable appliances, such as a set top box ("STB") 104, a VCR 106, an audio amplifier/receiver 108 and a television 102, as well as a controlling device 100*a*. The controlling device 100a is capable of transmitting commands to the appliances, using any convenient IR, RF, Point-to-Point, or networked protocol, to cause the appliances to perform operational functions. While illustrated in the context of a STB 104 with VCR 106, audio system 108 and television 102, it is to be understood that controllable appliances can include, but are not limited to, televisions, VCRs, DVRs, DVD players, cable or satellite converter set-top boxes (STBs), amplifiers, CD players, game consoles, home lighting, drapery, fans, HVAC systems, thermostats, personal computers, etc.

Figure 2:
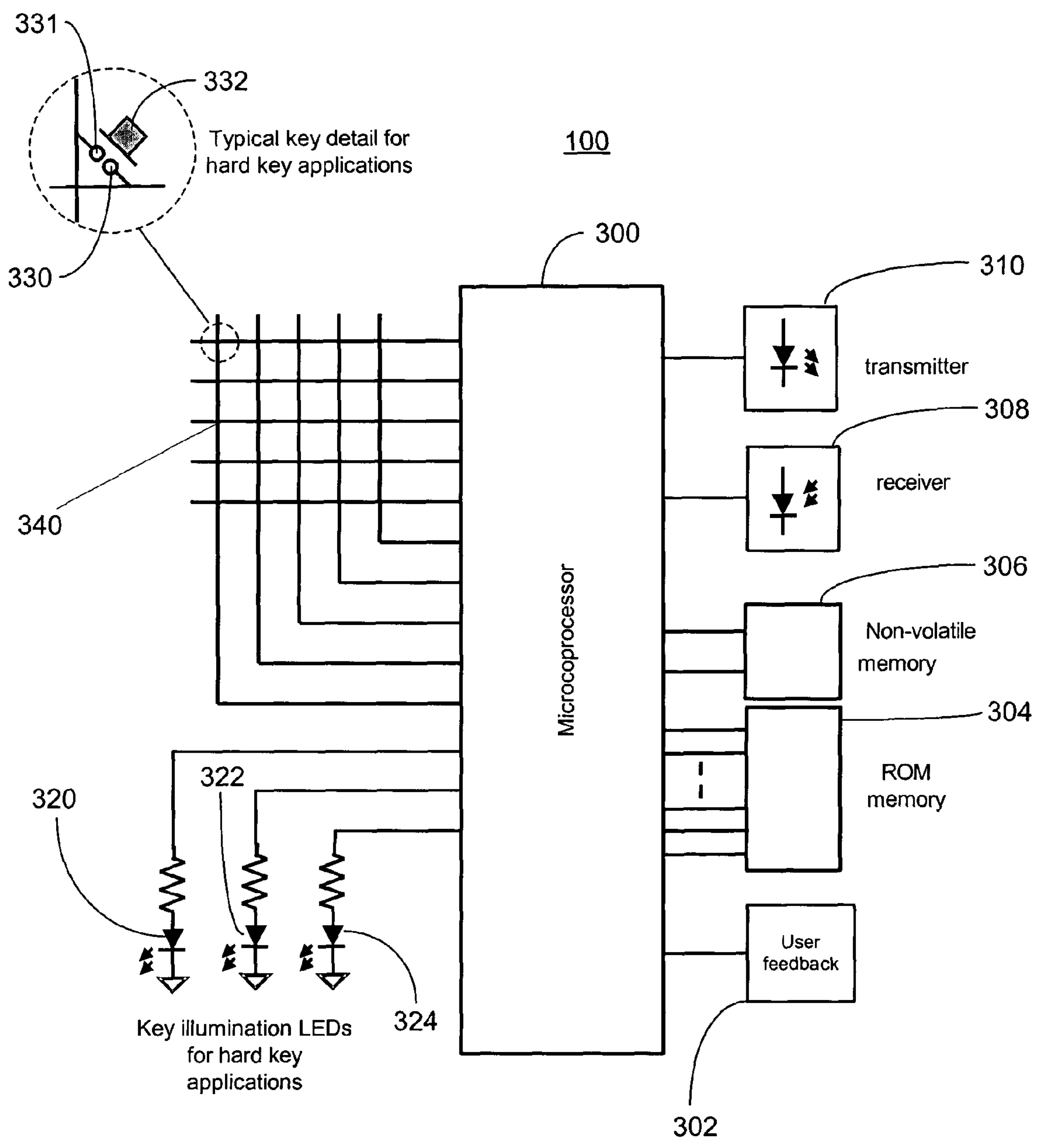
FIG. 2 illustrates a block diagram of exemplary components of the exemplary controlling devices.

For use in commanding the functional operations of one or more appliances, the controlling devices 100 may include, as needed for a particular application, a processor 300 coupled to a ROM memory 304, a key matrix 340 (e.g., hard keys, soft keys such as a touch sensitive surface overlaid on a liquid crystal (LCD) or electroluminescent (EL) display, or a combination thereof), transmission circuit(s) 310, receiver circuit (s) 308 and/or transceiver circuit(s) (e.g., IR and/or RF), a non-volatile read/write memory 306, a means 302 to provide feedback to the user (e.g., LED, display, speaker, and/or the like), and key illumination means, as illustrated in FIG. 2. As will become apparent, the key illumination means may be in the form of separate elements, such as LEDs 320, 322, and 324 associated with a hard key matrix, or may be integrated as part of the key matrix, for example in the case where the key matrix is implemented using a touch screen display. In the case where the controlling device 100 includes hard keys, an exemplary molded-in key 332 is shown as operative with key matrix circuit 330, 331. The nature and function of keys 332 on the remote are described in greater detail below.

As will be understood by those skilled in the art, the ROM memory 304 may include executable instructions that are intended to be executed by the processor 300 to control the operation of the remote control 100. In this manner, the processor 300 may be programmed to control the various electronic components within the remote control 100, e.g., to monitor the power supply (not shown), to cause the transmission of signals, and control the key illumination means 320, 322, and 324. The non-volatile read/write memory 306, for example an EEPROM, battery-backed up RAM, Smart Card, memory stick, or the like, may be provided to store setup data and parameters as necessary. While the memory 304 is illustrated and described as a ROM memory, memory 304 can also be comprised of any type of readable media, such as ROM, RAM, SRAM, FLASH, EEPROM, or the like. Preferably, the memory 304 is non-volatile or battery-backed such that data is not required to be reloaded after battery changes. In addition, the memories 304 and 306 may take the form of a chip, a hard disk, a magnetic disk, and/or an optical disk.

To cause the controlling device 100 to perform an action, the controlling device 100 is adapted to be responsive to events, such as a sensed user interaction with the key matrix 340, receipt of a transmission via receiver 308, etc. In response to an event, appropriate instructions within the memory 304 may be executed. For example, when a function command key is activated on the controlling device 100, the controlling device 100 may retrieve a command code corresponding to the activated function command key from memory 304 and transmit the command code to an intended target appliance, e.g., STB 104, in a format recognizable by that appliance. It will be appreciated that the instructions within the memory 304 can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. A further, local operation is the ability to "lock" function keys across device operational modes as described in U.S. Published Patent Application No. 2003/0025840. Examples of still further local operations can be found in U.S. Pat. Nos. 5,481,256, 5,959,751, and 6,014,092.

Figure 3:
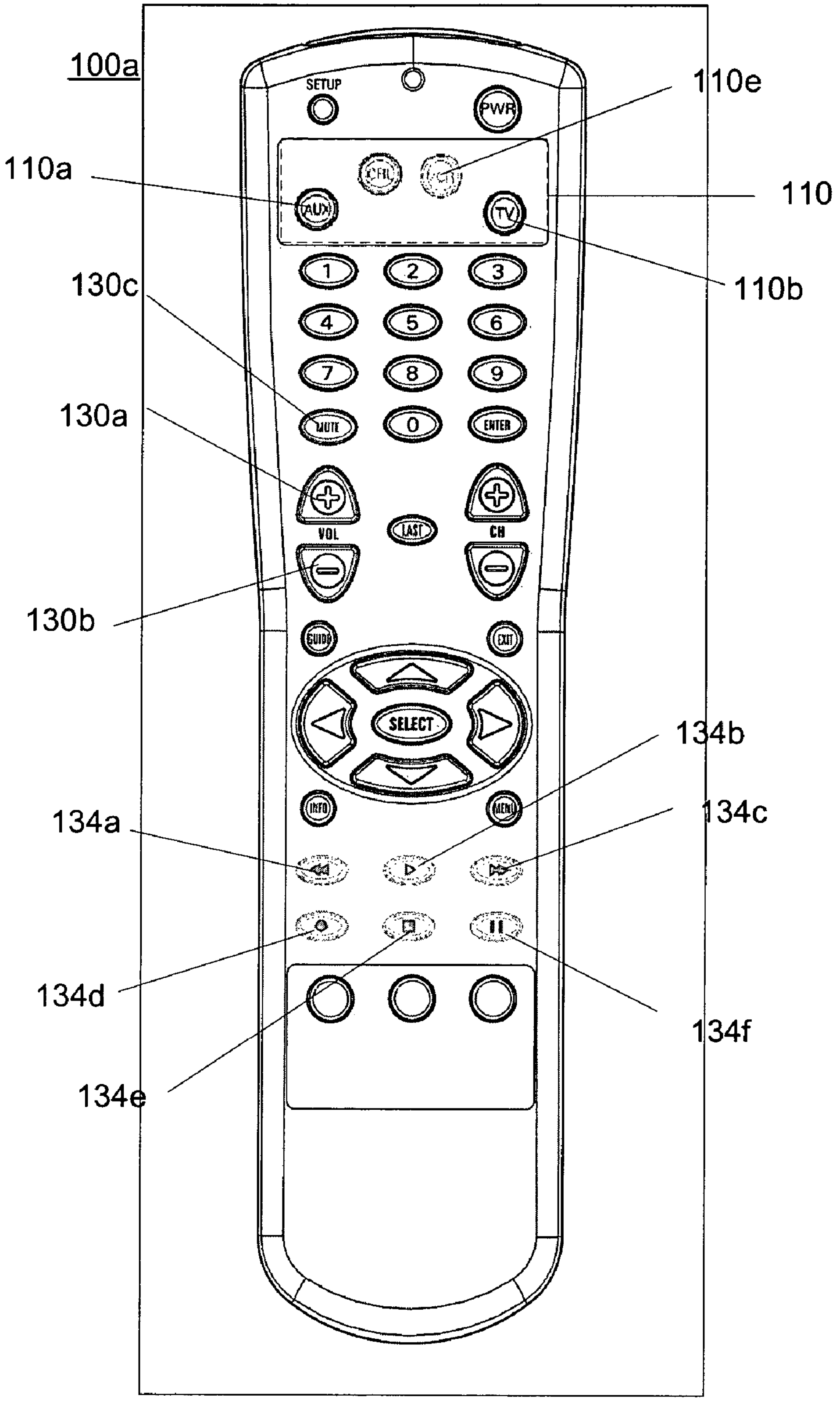
FIG. 3 illustrates an exemplary controlling device having illuminable, hard function keys.

For creating a correspondence between a command code and a function command key, data may be entered into the controlling device 100 that functions to identify an intended target appliances by its type and make (and sometimes model). Such data allows the controlling device 100 to transmit recognizable command codes in the format appropriate for such identified appliances. Typically, intended target appliances are identified for each operational mode of the controlling device 100. By way of example, FIG. 3 illustrates a controlling device 100*a* having a "TV" operational mode, "AUX" operational mode, "VCR" operational mode, and "CBL" operation mode which are selectable through activation of a corresponding device mode selection key 110. Since methods for setting up a controlling device to command the operation of specific home appliances are well-known, such methods need not be described in greater detail herein. Nevertheless, for additional information pertaining to setup procedures, the reader may turn to U.S. Pat. Nos. 4,959,810, 5,614,906, and 6,225,938. It will also be appreciated that the controlling device 100 may be set up to command an appliance 102 by being taught the command codes needed to command such appliance as described in U.S. Pat. No. 4,623,887. Still further, it will be understood that command codes may be pre-stored in the controlling device 100 or the controlling device 100 may be upgradeable, for example via use of receiver 308.

Figure 4:
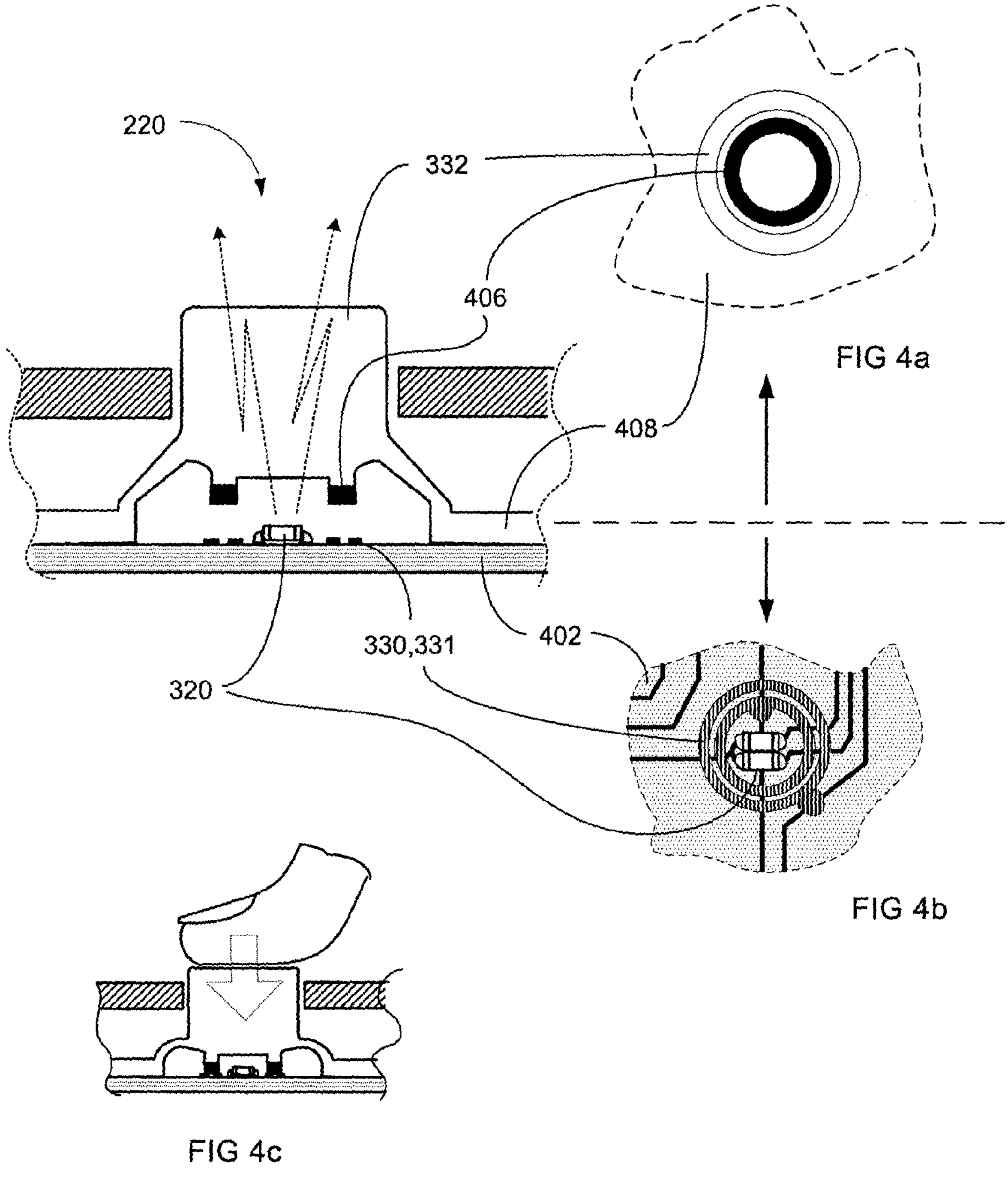
FIG. 4 illustrates a cross-sectional view of the hard function keys of the exemplary controlling device of FIG. 3.

Turning to FIG. 4, there is illustrated an exemplary mechanical construction of an illuminated key 220, such as would be used in connection with the hard keys of the controlling device 100*a* of FIG. 3. As is known in the art, a controlling device keypad typically comprises a silicon rubber sheet 408 with molded-in key caps 332, in this case of translucent material at least in the area of the keycap(s) 332 which are to be illuminated. The underside of the keycap 332 is equipped with conductive carbon puck 406 in the shape of a ring. Key contact areas 330 and 331, comprising conductive ink silk-screened onto the printed circuit board 402 in the form of two concentric rings, are positioned directly below the conductive puck 406 such that the key matrix circuit 330, 331 is completed when key 220 is depressed as illustrated in FIG. 4*c*. A surface mount type LED 320 is positioned directly below the center of the translucent keycap 332 such that the key may be illuminated from below when an LED is enabled by the microcontroller 300. Although only a single, multi-colored LED is illustrated for clarity, it will be appreciated that multiple, different colored LEDs may be easily substituted. In the illustrated case, the multi-colored LED may comprise at least two individually-controllable junctions (e.g., two primary colored LEDs) contained in a single package.

With such a device, multiple colors are possible (e.g., the two primary colors and the secondary color for the combined primary colors) depending upon which LEDs are enabled.

Figure 5A:
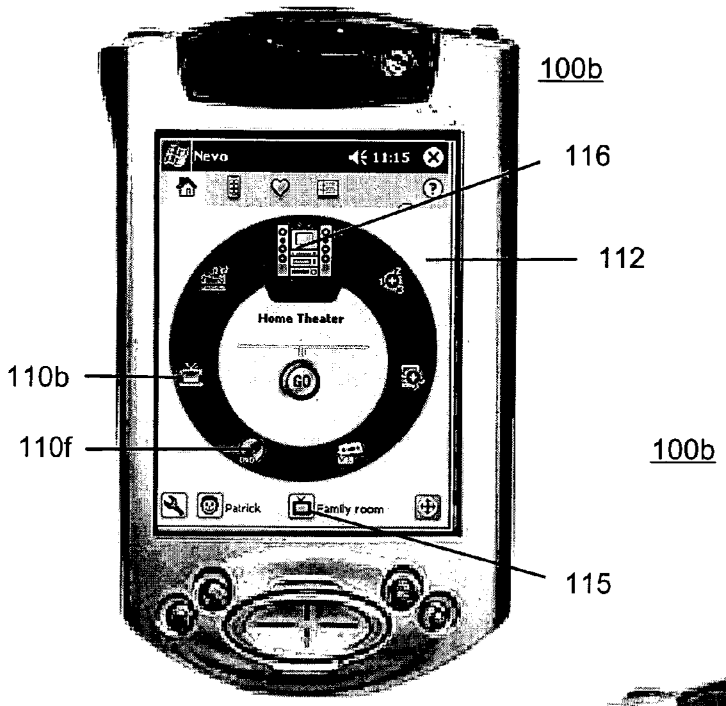
FIG. 5 illustrates an exemplary controlling device having a touch screen display.
Figure 5B:
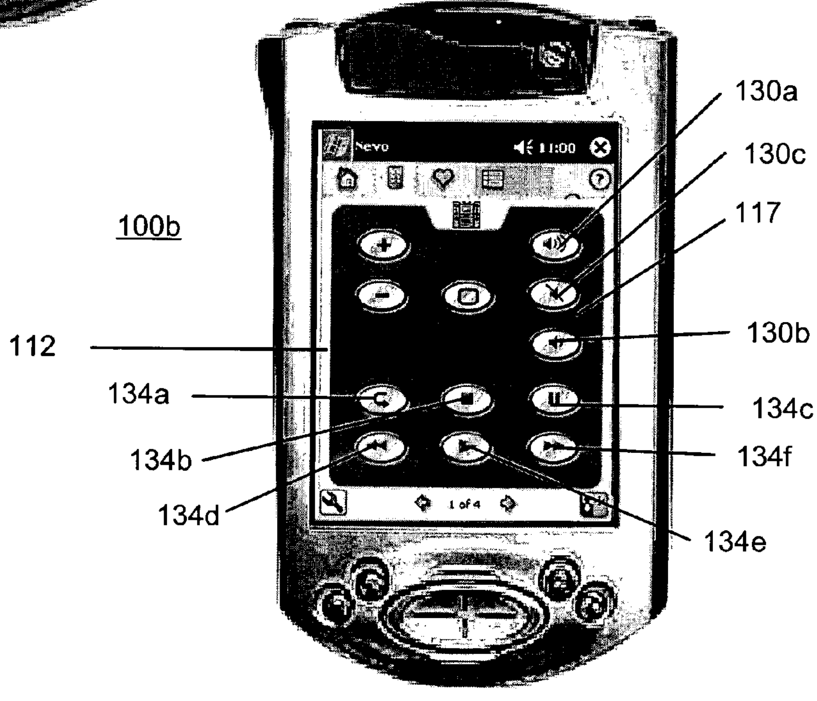

By way of further example, FIGS. 5*a*-5*b* illustrate a controlling device 100*b* having a display 112. In this illustrated example, the display 112 comprises a touch screen that allows a user to interact with the controlling device 100*b* to, for example, setup the controlling device, select operational modes of the controlling device 100*b*, etc. In this regard, FIG. 5*a* shows a selection wheel by which operational mode selection may be accomplished. For example, selecting a "device" icon 110 may place the controlling device 100*b* in a device operational mode (e.g., TV, VCR, etc.), selecting a "room" icon 115 may place the controlling device 100*b* in a mode for commanding the operation of appliances in a designated room (e.g., living room, bedroom, etc.), or selecting a "home theater" icon 116 may place the controlling device 100*b* in a mode for commanding the operation of multiple appliances within a home theater system. FIG. 5*b* illustrates a display of example function control keys 117 in a "home theater" page. Such a display-centric controlling device is particularly described and illustrated in commonly owned U.S. Application Ser. Nos. 60/264,767, 09/905,423, 09/905,432, and 09/905,396.

Figure 6:
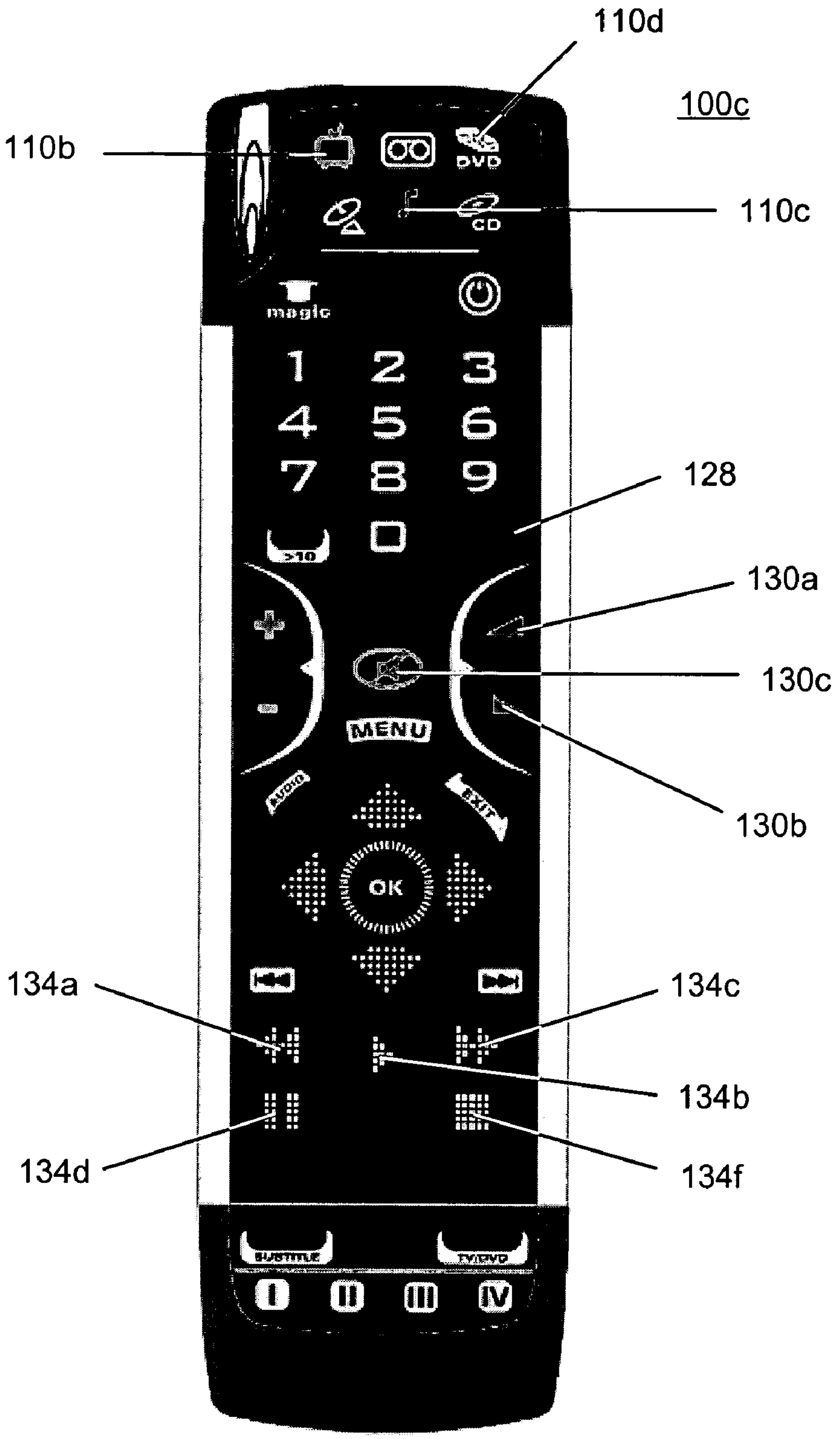
FIG. 6 illustrates an exemplary controlling device having an EL display.

By way of still further example, FIG. 6 illustrates a controlling device 100*c* which includes an electro-luminescent display 128. Unlike the controlling device 100*a* illustrated in FIG. 3, which includes silicon rubber keypads protruding through cut-outs in a hard plastic upper housing, the controlling device 100*c* uses a flexible, segmented electroluminescent ("EL") panel that is overlaid over a dome switch style key matrix. An example controlling device having such an EL panel is particularly illustrated and described in commonly owned U.S. application Ser. No. 10/410,103. Of particular note, the EL panel may be constructed to allow various parts of the display to be independently illuminated using different colors under control of the microprocessor 300 and an EL display interface.

The ability to independently illuminate various parts of the controlling device 100, e.g., the keys and/or display, with different colors may be used to advantageously provide a user of the controlling device 100 with a visual indication as to which appliance a command should be transmitted to (e.g., the intended target) when a function key is activated. For example, a color association between a function key and an appliance may be used to provide a user with information indicative of which function keys are locked to which appliances across the various "device" modes. Still further, the color association between a function key and an appliance may be used to provide a user with information indicative of which function key is assigned to which appliance when multiple appliances are controllable from a user interface, e.g., when the controlling device 100 is in a "home theater" operational mode.

As discussed previously, a color indicative of an intended target appliance may be associated with a function key by, for example, illuminating one or more appropriately colored LEDs that are associated with the function key (e.g., in the case of "hard" keys), by displaying an icon, area surrounding an icon, etc. with the appropriate color (e.g., in the case of "soft" keys), or by illuminating one or more appropriately colored segments of an EL panel that are associated with the function key (e.g., in the case of "EL display" keys). In any of these instances, a color that is selected so as to be indicative of an intended target appliance may be predefined or user-selectable. Furthermore, the absence of a color being associated with a function key may also be indicative of an intended target appliance.

By way of example, FIG. 3 illustrates a controlling device 100*a* having hard keys in which the volume control function keys 130 (e.g., volume up 130*a*, volume down 130*b*, and mute 130*c* function keys) have as their intended target the appliance designated as the intended target when the appliance is in the "AUX" device mode. The relationship between the function keys and the "AUX" device as the intended target may be presented to the user by causing each of the volume control function keys 130 to be illuminated, by means of illuminating the appropriate LED(s), with a red color. In this case, the user may simply know that the color red is indicative of a function key having the "AUX" device as its intended target. The relationship between the function keys and the "AUX" device as the intended target may also be presented to the user by causing the "AUX" device mode selection key 110*a* to be optionally illuminated the same color as the function keys that have the "AUX" device as the intended target, e.g., by also causing the "AUX" device mode selection key 110*a* to be illuminated red. Similarly, a relationship between the transport control function keys 134 (e.g., the rewind 134*a*, play 134*b*, fast forward 134*c*, record 134*d*, stop 134*e*, and pause 134*f* function keys) and the "VCR" device as the intended target may be presented to the user by causing each of the transport control function keys 134 to be illuminated with a green color. Again, the "VCR" device mode selection key 100*e* may be illuminated with the same green color to allow a user to discern the relationship between the device mode intended target appliance and the function keys 134.

By way of still further example, FIG. 5*b* illustrates a "home theater" page of the controlling device 100*b* in which the volume control function keys 130 (e.g., volume up 130*a*, volume down 130*b*, and mute 130*c* function keys) have as their intended target the appliance designated as the intended target when the appliance is in the "TV" device mode. The relationship between the function keys and the "TV" device as the intended target may be presented to the user by causing each of the volume control function keys 130 (or areas surrounding or in the vicinity of the volume control function keys 130) to be illuminated, by means of displaying, a red color. In this case, the user may simply know that the color red is indicative of a function key having the "TV" device as its intended target. The relationship between the function keys and the "TV" device as the intended target may also be presented to the user by causing the "TV" device mode selection key 110*b* to be optionally illuminated the same color as the function keys that have the "TV" device as the intended target, e.g., by also causing the "TV" device mode selection key 110*b* of the device selection page, illustrated in FIG. 5*a*, or appropriate area(s) adjacent thereto, to be illuminated red. Similarly, a relationship between the transport control function keys 134 (e.g., the rewind 134*a*, play 134*b*, fast forward 134*c*, stop 134*e*, and pause 134*f* function keys) and the "DVD" device as the intended target may be presented to the user by causing each of the transport control function keys 134 (or areas surrounding or in the vicinity of the transport control function keys 134) to be illuminated with a green color. Again, the "DVD" device mode selection key 100*f* may be illuminated with the same green color, for example in the mode selection page of FIG. 5*a*, to allow a user to discern the relationship between the device mode intended target appliance and the function keys 134.

By way of yet another example, FIG. 6 illustrates a controlling device 100*c* having an EL display in which the volume control function keys 130 (e.g., volume up 130*a,* volume down 130*b*, and mute 130*c* function keys) have as their intended target the appliance designated as the intended target when the appliance is in the "AMPLIFIER" device mode. The relationship between the function keys and the "AMPLIFIER" device as the intended target may be presented to the user by causing each of the volume control function keys 130 (or areas surrounding or in the vicinity of the volume control function keys 130) to be illuminated, by means of illuminating the appropriate EL segment(s), with a red color. In this case, the user may simply know that the color red is indicative of a function key having the "AMPLIFIER" device as its intended target. The relationship between the function keys and the "AMPLIFIER" device as the intended target may also be presented to the user by causing the "AMPLIFIER" device mode selection key 110*c* to be optionally illuminated the same color as the function keys that have the "AMPLIFIER" device as the intended target, e.g., by also causing the "AMPLIFIER" device mode selection key 110*c*, or appropriate area(s) adjacent thereto, to be illuminated red. Similarly, a relationship between the transport control function keys 134 (e.g., the rewind 134*a*, play 134*b*, fast forward 134*c*, stop 134*e*, and pause 134*f* function keys) and the "DVD" device as the intended target may be presented to the user by causing each of the transport control function keys 134 (or areas surrounding or in the vicinity of the transport control function keys 134) to be illuminated with a green color. Again, the "DVD" device mode selection key 100*f* may be illuminated with the same green color to allow a user to discern the relationship between the device mode intended target appliance and the function keys 134.

If, for example, the volume transport function keys 134 and the volume control function keys 132 are locked to their respective devices, the transport function keys 134 and the volume control function keys 132 may continue to be illuminated using an appropriate device-indicative color even when the controlling device 100 is placed into others of its various home theater, room, or device operational modes. It will be appreciated that the LEDs, EL segments, display, etc. need not be constantly illuminated in a device-indicative color but that a key or the like may be activatable by the user to temporarily illuminate the LEDs, EL segments, display, etc. in an appropriate color given the present operational mode of the controlling device 100 and the intended target appliance(s) of the function keys within that operational mode.

While the foregoing describes controlling devices 100 that use color to indicate function key and appliance relationships, it is contemplated that other identification schemes (which may used in addition to or in lieu of color) may be provided to indicate function key and appliance relationships. For example, function key and appliance relationships may be indicated by controlling the tint, contrast, or brightness of displayed function keys and/or area(s) visually associated with function keys. Still further, function key and appliance relationships may be indicated by providing a visually identifiable pattern, shape, icon, or alphanumeric tag to a function keys and/or area(s) visually associated with function keys (e.g., imposing a crosshatch or other pattern on all function keys associated with a particular appliance, using commonly shaped function keys for an associated appliance, surrounding each function key with (or appending in super/subscript fashion) a shape or icon representing the associated device, appending an alphanumeric tag on or near a function key indicating the associated appliance, etc.). Yet further, function key and appliance relationships may be indicated by associating a distinct audible sound, such as sounds that repeat in different numbers, are emitted using different frequencies, and/or are emitted in different sequences, to a function key that is representative of an intended target appliance. In this manner, activation of a function key may cause the controlling device to emit the audible sound that has been associated with the function key where the emitted sound is representative of the intended target appliance.

Figure 7:
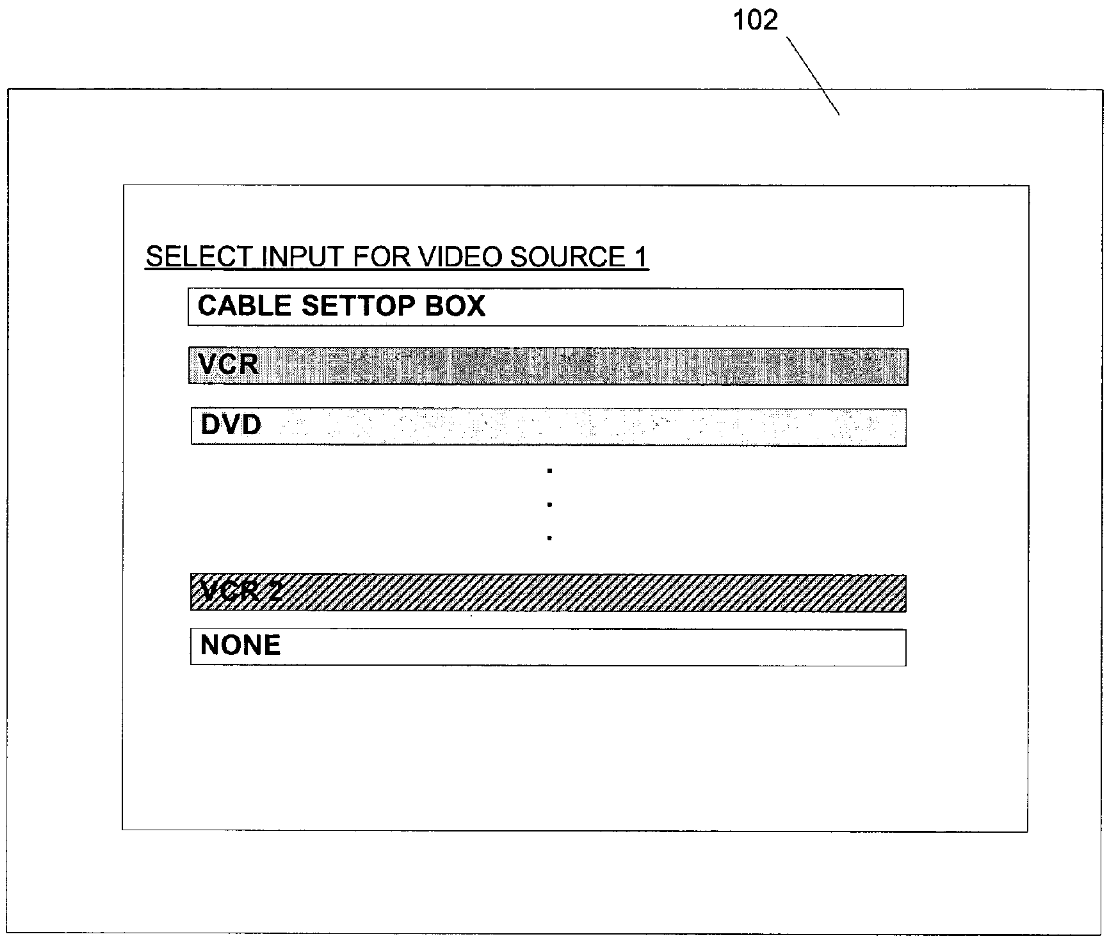
FIG. 7 illustrates an exemplary television input selection menu display in which video source choices are color coordinated with the controlling device function keys.

Still further, with reference to FIGS. 1 and 7 visual and/or audio cues may be utilized in connection with appliance setup processes. For example, in some cases an appliance (e.g., television 102) may be setup to receive input(s) from one or more appliances (e.g., audio-visual input from cable box 104 and/or VCR 106). In such a case, in connection with the receiving appliance being setup to designate input or transmitting appliance(s), cues may be presented to the user that function to represent the transmitting appliance(s) (e.g., a Cable source may be provided with a yellow cue, a VCR source may be provided with a green cue, a DVD source provided with a blue cue, etc. as illustrated in FIG. 7). The cues provided to represent the transmitting appliances during setup processes may be pre-selected and/or user selectable.

The cues utilized to represent the transmitting appliances during an appliance setup process may then be used to represent an intended target appliance for function keys (and device modes) of the controlling device 100. For example, in the example illustrated in FIG. 7, the VCR is provided with a green colored cue which is utilized to represent the VCR during the appliance setup process. Accordingly, the same green colored cue may be associated with function keys of the controlling device 100 that have the VCR as an intended target appliance. In certain cases, such as when the controlling device 100 is supplied with the appliance that is to be setup, it may be preferred to have the cue and appliance relationships predefined in both the controlling device 100 and the appliance to be setup to ensure consistency between the utilized cues. In certain other case, cue/appliance relationships utilized during the setup process can be communicated from the appliance being setup to the controlling device 100 (for example using IR or RF transmissions). Such a communication may include data that functions to identify the appliance type of any selected inputs and the cues associated with those appliance(s) whereby the controlling device 100 may use the data to set itself up to use the same cue to represent the same appliance(s) (i.e., in association with function keys when the appliance is to be an intended target appliance and/or in association with a device mode key to which the appliance has been assigned).

While various concepts have been described in detail, it will be appreciated by those skilled in the art that various modifications and alternatives to those concepts could be developed in light of the overall teachings of the disclosure. For example, it should be appreciated that particularly where controlling devices having multi-color display screens are involved (i.e., PDA or other LCD based controlling devices), many combinations and variations of the above described function key association features are possible without departing from the spirit and scope of the present invention. As such, the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A method for using color to indicate a relationship between a controlling device and a plurality of appliances, comprising:

in response to an activation of a device mode key of the controlling device, causing a processor of the controlling device to select from a plurality of colors a first color representative of a first target one of the plurality of appliances to illuminate a first group of function keys comprised of a plurality of function keys wherein each of the plurality of functions keys in the first group of function keys is activatable to cause a transmission of a command to the first target one of the plurality of appliances to control a different operation of the first target one of the plurality of appliance and to concurrently select from the plurality of colors a second color representative of a second target one of the plurality of appliances to illuminate a second group of function keys comprised of a plurality of function keys wherein each of the plurality of functions keys in the second group of function keys is activatable to cause a transmission of a command to the second target one of the plurality of appliances to control a different operation of the second target one of the plurality of appliance.

2. The method as recited in claim 1, wherein the first group of function keys comprises at least one of a volume control function key group, a channel control function key group, and a transport control function key group.

3. The method as recited in claim 1, wherein the first group of function keys and the second group of functions keys comprise different ones of a volume control function key group, a channel control function key group, and a transport control function key group.

4. The method as recited in claim 1, wherein the first group of function keys are illuminated in the first color via at least one LED.

5. The method as recited in claim 1, wherein the first color and the second color are user selectable via interaction with the controlling device after manufacture of the controlling device.

6. The method as recited in claim 1, wherein the first color and the second color are predefined during manufacture of the controlling device.

7. The method as recited in claim 1, wherein a first device mode key of the controlling device used to place the controlling device into a mode for issuing commands primarily to the first target one of the plurality of appliances is caused to be illuminated in the first color.

8. The method as recited in claim 7, wherein a second device mode key of the controlling device used to place the controlling device into a mode for issuing commands primarily to the second target one of the plurality of appliances is caused to be illuminated in the second color.

9. A method for using color to indicate a relationship between a controlling device and a plurality of appliances, comprising:

in response to an activation of a first device mode key of the controlling device, causing a processor of the controlling device to select from a plurality of colors a first color representative of a first target one of the plurality of appliances to illuminate a group of function keys each having an associated function indicating label wherein each one of the function keys in the group of function keys is activatable to cause a transmission of a command to control an operation of the first target one of the plurality of appliance wherein the operation controlled in the first target one of the plurality of appliances is consistent with the function indicating label associated with the one of the function keys of the group of function keys activated; and in response to an activation of a second device mode key of the controlling device subsequent to the activation of the first device mode key, causing the processor of the controlling device to select from the plurality of colors a second color representative of a second target one of the plurality of appliances to illuminate the group of function keys wherein each one of the function keys in the group of function keys is activatable to cause a transmission of a command to control an operation of the second target one of the plurality of appliance wherein the operation controlled in the second target one of the plurality of appliances remains consistent with the function indicating label associated with the one of the function keys of the group of function keys activated;

wherein the first color representative of the first target one of the plurality of appliances is different than the second color representative of the second target one of the plurality of appliances and wherein the function indicating labels associated with each of the function keys in the group of function keys remain unchanged in response to the activation of the second device mode key of the controlling device subsequent to the activation of the first device mode key.

10. The method as recited in claim 9, wherein the group of function keys comprises at least one of a volume control function key group, a channel control function key group, and a transport control function key group.

11. The method as recited in claim 9, wherein the first group of function keys are illuminated in the first color via at least one LED.

12. The method as recited in claim 9, wherein the first color and the second color are user selectable via interaction with the controlling device after manufacture of the controlling device.

13. The method as recited in claim 9, wherein the first color and the second color are predefined during manufacture of the controlling device.

14. The method as recited in claim 9, wherein the first device mode key of the controlling device is caused to be illuminated in the first color.

15. The method as recited in claim 14, wherein the second device mode key of the controlling device is caused to be illuminated in the second color.

* * * * *